United States Patent

Zakaria et al.

Patent Number: 5,206,479
Date of Patent: Apr. 27, 1993

[54] MICROWAVE HEATING SYSTEM

[75] Inventors: Zairani Zakaria, Charlotte; Edwin D. Neas, Matthews; Dennis P. Manchester, Matthews; Wyatt P. Hargett, Matthews, all of N.C.

[73] Assignee: CEM Corporation, Matthews, N.C.

[21] Appl. No.: 518,954

[22] Filed: May 4, 1990

[51] Int. Cl.$^5$ .............................................. H05B 6/80
[52] U.S. Cl. ...................... 219/10.55 F; 219/10.55 E; 219/10.55 A; 219/10.55 M; 366/247; 366/274
[58] Field of Search ............... 366/208, 220, 217, 219, 366/273, 274, 247; 219/10.55 F, 10.55 E, 10.55 R, 10.55 M, 10.55 B, 10.55 A; 220/254, 256, 352, 319; 215/DIG. 2, 254

[56] References Cited

U.S. PATENT DOCUMENTS

| T911,002 | 6/1973 | Henry | 366/273 |
|---|---|---|---|
| 2,954,517 | 11/1960 | Harker et al. | 366/273 |
| 3,749,369 | 7/1973 | Landsberger | 366/273 |
| 3,848,363 | 11/1974 | Lovness et al. | 366/273 |
| 4,092,512 | 5/1978 | Suzuki et al. | 219/10.55 F |
| 4,167,661 | 9/1979 | Ohkubo | 219/10.55 F |
| 4,483,623 | 11/1984 | Eaton et al. | 366/273 |
| 4,613,738 | 9/1986 | Saville | 219/10.55 R |
| 4,877,624 | 10/1989 | Floyd et al. | 219/10.55 A |
| 4,904,450 | 2/1990 | Floyd | 219/10.55 E |
| 4,940,865 | 7/1990 | Johnson et al. | 219/10.55 A |
| 5,025,133 | 6/1991 | Tsutahara et al. | 219/462 |

Primary Examiner—Bruce A. Reynolds
Assistant Examiner—Tuan Vinh To
Attorney, Agent, or Firm—Raymond F. Kramer

[57] ABSTRACT

A microwave heating system which is especially useful for rapidly, uniformly and positively sterilizing biological media, such as broths and gels used as incubation or growth media for bacteria, includes a source of microwave radiation, a microwave chamber, a container or a plurality of containers in the chamber, and a mixer for mixing the contents of the container or containers during heating. The mixer is at least partially external to the container and is capable of operating when the container is positively sealed to prevent contamination of the contents, and the mixer is preferably a combination of an external magnet and a mixing element which is at least in part of magnetic material and is moved by changes in the magnetic field set up by the magnet, as the container and contained mixing element are moved with respect to the magnet, as on an oscillating turntable. Other systems for mixing the material in the container are also within the invention, although they are not as satisfactory as that previously described, and such other systems include mechanical systems, such as solenoid activated cores or extensions thereof for pushing vertically against a turntable and thereby moving it out of its normal horizontal plane, cams for accomplishing the same purpose, devices for causing the containers to swing, in pendulum-like motion, as they are rotated, and ultrasonic devices. The apparatus may be used for various other heating operations and even for mixings, without heatings.

19 Claims, 5 Drawing Sheets

MICROWAVE HEATING SYSTEM

This invention relates to a microwave heating system. More particularly, it relates to such a system in which a fluid state material, usually a liquid, semi-liquid or particulate solid, is heated in a container by means of microwave radiation, while at the same time it is being mixed in such container, which improves the efficiency and uniformity of the heating, preventing localized hot and cold spots. Such a system is especially useful for quickly sterilizing biological media and for other heatings of materials, especially in sealed containers, which may be sealed to prevent contamination of the materials being heated and/or to prevent escape thereof from the containers. The invention also relates to processes for microwave heatings of materials, which may utilize the described system.

Prior to the present invention it was known to utilize microwave radiation for heating various materials, including foods, reactants, analytical samples, drugs and wastes, for various purposes, including cooking, chemical processing, analyzing and sterilizing. Microwave ovens and microwave systems are known in which radiation mixers are utilized to ensure that the microwave radiation into a microwave chamber is sufficiently uniform for even heatings of contents, such as uniform cooking of larger food items, e.g., roasts and fowl. Additionally, mechanical means, such as turntables or carousels, have been employed to rotate items to be heated in the microwave chamber to further promote even heating. In U.S. patent application Ser. No. 07/352,003, filed by two of the present inventors (Zakaria and Neas) on May 15, 1989, there is described the sterilization of biological media by microwave radiation. In the apparatuses illustrated therein such a medium, in liquid or gel form, is heated in a sealable container that is moved in oscillating rotation on a turntable in a microwave chamber. However, although the processes described in that patent application are effective to sterilize such media and were significantly faster than prior art autoclaving operations, it still often took as long as fifteen minutes heating to effect certain sterilization, using a 1,500 or 2,000 watt microwave generator, and faster and more assuredly effective sterilizations were desirable. U.S. patent application Ser. No. 07/352,003 is hereby incorporated herein by reference.

As a result of research efforts to improve the speed and evenness of microwave heatings and sterilizations of materials, especially those in sealed or sealable containers, the present invention has been made, which is of a system for improved microwave heating of a material in a container in a microwave chamber, which comprises:a walled chamber, a source of microwave radiation, which radiation is directed into the chamber, a walled container, in the chamber, for holding the material to be heated, and means for mixing the contents of the container during microwave heating thereof, which means comprise means external to the container for producing a magnetic field in the container, and/or means for moving the container in a direction that has a vertical component and/or means for producing ultrasonic vibrations in the container and, when such means produce such a magnetic field, a magnetic mixer in the container, which is set in mixing motion by relative changes in such field.

A search of the prior art has not resulted in the finding of any references which anticipate the present invention or which make it obvious, either alone or in any combination thereof. Although some of the patents found describe mixings of materials being microwave heated, during such heating process they effect such combined heatings and mixings in manners different from those of this invention and less conveniently and less efficiently. Also, several require externally driven mixer shafts to pass through an opening into the container of material being mixed, which makes possible contamination of such mix and escape of materials from the container along the clearance between the drive shaft and the closure. Other such search patents describe apparatuses and systems which are too complicated or too large to be practical for heatings, such as sterilizations, of relatively small quantities of materials, such as of biological media.

U.S. Pat. No. 4,254,319 describes a combination portable turntable and drive mechanism for heating and stirring food to be cooked, with the food, in a container, being coaxially rotated on a turntable so that it moves past a stationary stirrer. U.S. Pat. No. 4,336,435 illustrates a mechanism for holding a bag of frozen blood plasma and imparting motion to the bag during microwave heating and thawing of the plasma therein. U.S. Pat. No. 4,571,474 illustrates a rotisserie/stirrer for a microwave oven wherein an inclined cylinder, with internal ribs, rotates about its axis while microwave radiation is directed onto the food contents thereof, with the ribs serving to stir the food in the container: U.S. Pat. No. 4,714,813 discloses a mixer for use with a microwave oven which includes a substantially horizontally rotating mixing drum which is mountable on a turntable in a microwave oven so that rotary motion of the turntable causes the contents of the drum to be mixed or tumbled as the drum rotates about its axis. U.S. Pat. No. 4,751,357 illustrates a microwave oven apparatus which is particularly useful for kneading dough by vertical displacement of a sole plate during microwave heating. Use of an accessory having helicoidal blades further promotes more uniform mixing of container contents being heated by microwave radiation. It is noted that the drive shaft in this apparatus is communicated with the kneading and mixing means by a connector which passes through the base of the container. U.S. Pat. No. 4,773,317 is for an apparatus for use with a microwave oven, which apparatus includes a vessel for containing food, and blade members positionable within the vessel, which blades are maintained stationary as the vessel turns, to agitate the food. U.S. Pat. No. 4,855,555 is for another holder assembly for a plastic bag of frozen liquid, such as blood plasma, mounted on an arbor that projects into a microwave oven cavity. The arbor is rotatable and such rotation is to agitate the bag contents during microwave heating. Means are also provided for detecting the temperature of the bag or holder and for deenergizing the source of power if the temperature becomes too high. Finally, U.S. Pat. No. 4,856,203 is for a microwave vacuum dryer in which a propeller r type agitator is employed in the body of a mixer for material being dried so as to circulate the material in the mixer, into which microwave radiation is directed. The blades of the apparatus are rotated by the action of an external drive motor and shaft. Other references of interest that were noted during the search include U.S. Pat. Nos.: 4,045,638; 4,326,114; 4,471,195; 4,710,266; 4,742,202; and 4,882,851, but none of these is considered to be any more relevant to the invention than those that were discussed above.

From a review of the art found in the search it is evident that the system of this invention is far superior to those of the patents. It operates differently, is more convenient and is capable of easy installation in commercial microwave apparatuses (such as those manufactured by CEM Corporation, Matthews, North Carolina) which are employed in various analytical, chemical and drying processes. Also, it has been found that the present invention facilitates rapid, effective and reproducible heatings of fluent materials, and allows for such operations to be undertaken in sealed containers, under pressure, which prevents contamination and/or escape of contents, and heats better.

The invention will be readily understood by reference to the description thereof herein, taken together with the drawing in which.

Figure 1:
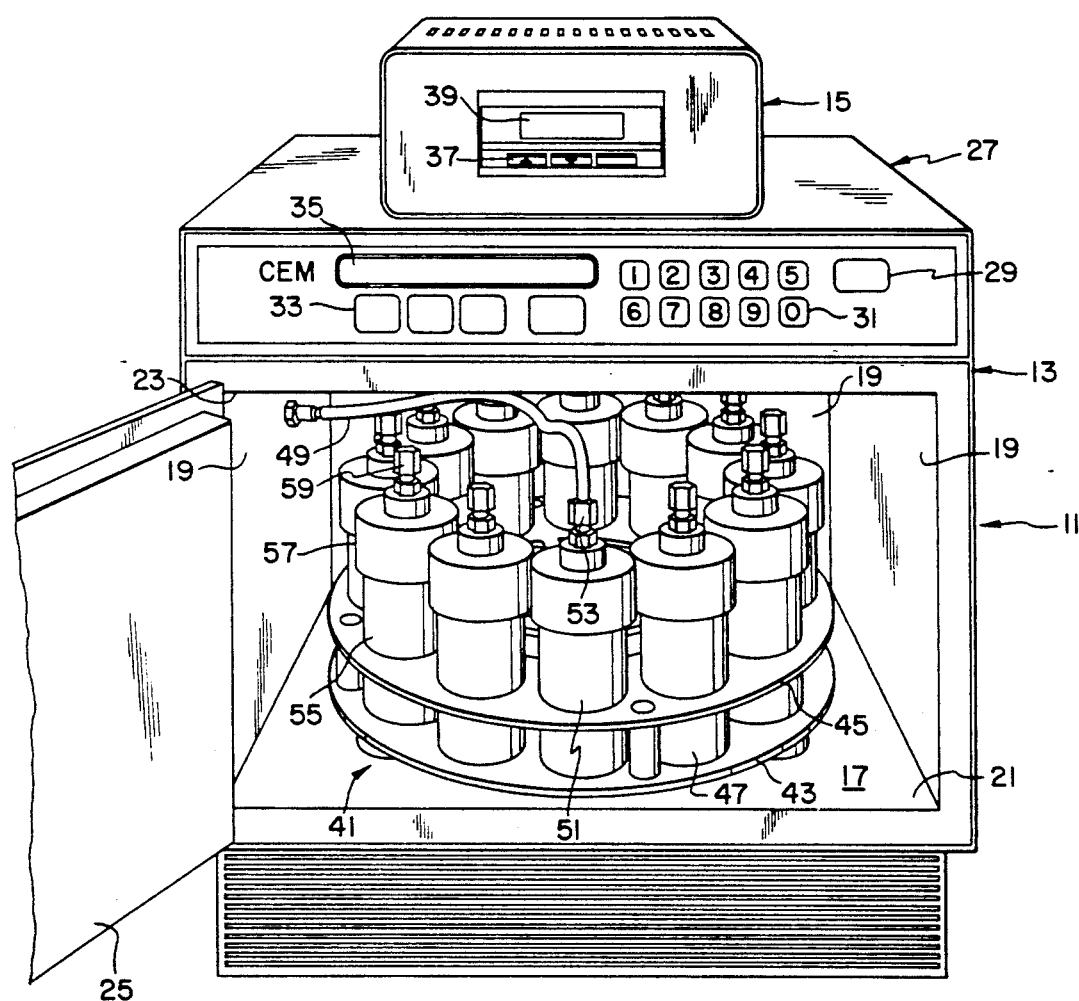
FIG. 1 is a front perspective view of the microwave heating system of the invention, showing twelve containers of material, such as containers of culture medium, mounted on an oscillating turntable in a digitally controlled microwave apparatus equipped with a pressure controller which is responsive to the pressure in one of the containers.

In FIG. 1 improved microwave heating system 11 is shown, which comprises, in the particular embodiment illustrated, microwave heating apparatus 13 and pressure-responsive controller 15, which is shown as a separate entity although its circuitry and functions may be included within the body of apparatus 13. Apparatus 13 includes a source (usually a magnetron, not shown) of microwave radiation that is directed into walled microwave chamber 17, which is bounded by walls 19, floor 21, upper wall 23 and door 25, which door is only partially illustrated. Chamber 17 confines the microwave radiation therein, preferably within stainless steel or aluminum walls, etc. Such alloy and metal do not interfere with magnetic flux generated about the mixing magnets, which drive the mixers. In the upper portion 27 of the microwave apparatus 13 there are present various digital controls, displays and circuitry of known types, together with a magnetron source of microwave radiation which is directed into chamber 17. Controls 29, 31 and 33 are used with alpha-numeric display 35 to control the operation of the microwave apparatus and to indicate the states of the microwave operations. Pressure responsive controller 15 is a digital controller which desirably indicates the pressure in a representative container in the microwave chamber of the system and automatically turns the magnetron on or off, or alternatively or also regulates the amount of power to the magnetron so as to maintain the desired pressure and corresponding temperature in containers of material being heated in the microwave system. The desired pressure may be set by means of control buttons or pads 37 and the set pressure and actual pressure may be displayed on visual display panel 39. As was indicated previously the pressure indicating and controlling circuitry may be built into apparatus 13 instead of being in a separate cabinet on top of such apparatus. The microwave apparatus and the pressure controlling apparatus are similar to those illustrated in U.S. patent application Ser. No. 07/352,003, previously described herein. Such apparatus was designated in the patent application as CEM Microwave Sterilization System (or CEM MSS 500) and was said to be a modification of an earlier microwave apparatus manufactured by CEM Corporation, which was identified by them as MDS-81. The MDS-81 apparatus is described in a brochure entitled CEM Corporation Microwave Drying/Digestion System, MDS-81, Laboratory Microwave System, which was published in 1981. Such an apparatus is also described in U.S. Pat. No. 3,909,598. The illustrated system 13 is a higher power (2,000 watts) system like the CEM MDS-81, including an oscillating turntable and the described mixers, with printed circuit controls to make the system operate like that of Ser. No. 07/352,003.

Inside microwave chamber 17 a turntable 41 includes a supporting deck 43 and a positioning deck 45, designed to support and position a plurality of walled containers 47, which are like corresponding containers of U.S. patent application Ser. No. 07/352,003 and which will be referred to in greater detail in the following description of FIG. 2. Pressure hose 49 communicates container 51 with pressure controller 15. As illustrated, container 51 includes a fitting 53 for communicating hose 49 in pressure tight relationship with the interior of container 51. However, because it is inconvenient and often not practical to communicate all of the containers in the microwave chamber with the pressure controller and because it has been found that any pressure variations between containers will be within tolerable limits in all the containers, relative to that indicated, such fittings are not present on the other containers but instead such containers will have screw caps sealing off the openings therein, such as headed cap 59, closing off the opening in container 55. To promote uniformity of heatings it will normally be preferable for all the containers to be of the same type and contain the same amount of the same material. To avoid having to employ extra fittings and additional caps the upper cover portions 57 may be made continuous on the top thereof, without any opening therein, except for the container which is to be attached to the pressure connection, if any such connection is to be utilized. If desired, pressure and/or temperature monitors may be installed in/on the containers to verify that heatings and pressurizations are uniform or acceptably close to uniformity. Also, temperature activated controls may be employed.

Figure 2:
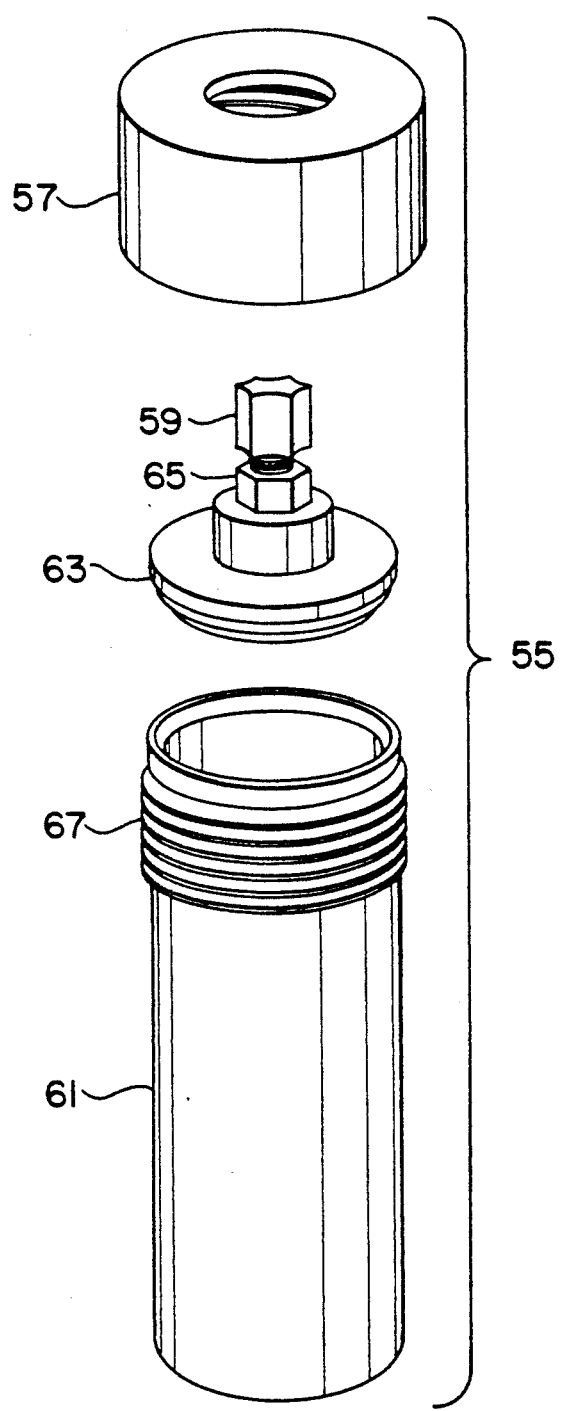
FIG. 2 is a view of a partially disassembled container in which fluent material, such as culture medium, is heatable and sterilizable in the microwave heating system of FIG. 1.

In FIG. 2 container 55 includes an externally threaded (near the top) container body portion 61, a closure 63, including internally threaded part 65, shown as being closed by cap 59, and a cover or collar portion 57, which is internally threaded so as to match the thread 67 of container part 61. Thus, on screwing down collar 57, which can be effected by hand, container atmosphere. Container 51, which communicates with the pressure controller, is of similar construction except that fitting 53, which may also be hand tightenable, allows communication of the container 51, with the pressure hose or tube 49 and via it with the pressure controller 15, which can control the pressure and temperature of the contents of the container 55 by turning the magnetron on and off, and/or by controlling the power to the magnetron. A shut-off valve or stop-cock may be located along tubing 49 to permit removal of container 51, the stop-cock and a length of the tubing from the apparatus after completion of heating without venting or loss of pressure in the container.

Figure 3:
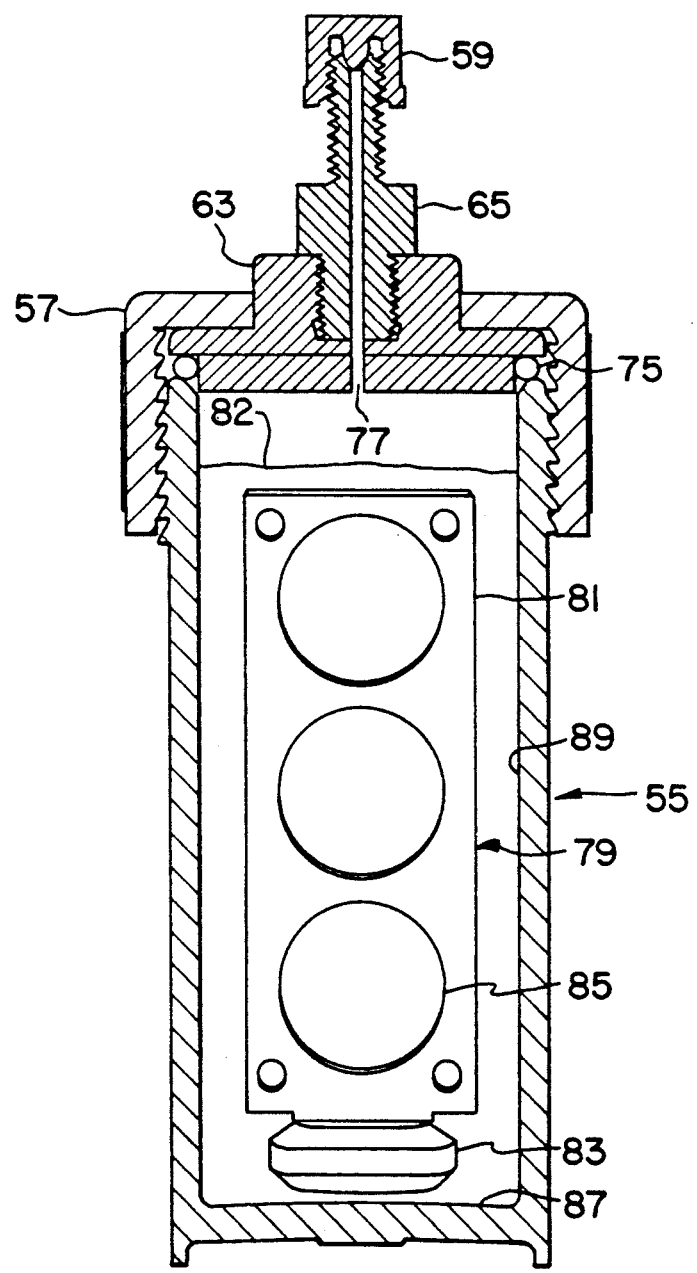
FIG. 3 is a centrally cutaway vertical sectional view of the assembled container of FIG. 2, showing positioning of a magnetic mixer therein.

In FIG. 3 there are shown details of the container 55 of FIG. 2 (slightly changed), with a magnetic stirrer therein. The container illustrated is like that of FIG. 2 but more details of the constructions of closure 63 and part 65 are given in FIG. 3 and the location of O-ring seal 75 is shown. Also, passageway 77, which can communicate with pressure tubing 49 when cap 59 is replaced by connecting fitting, such as a tightening nut adapted to press against a flared tubing end, is shown in FIG. 3. Inside container 55 a magnetic stirrer 79 is illustrated, which includes a relatively thin blade portion 81, which is of an inert synthetic organic polymeric plastic material, such as polytetrafluoroethylene, and a magnetic base portion 83, which is shown as a ceramic magnet encased in polytetrafluoroethylene. Blade 81 has a plurality of different sized circular openings 85 therein to facilitate movement of the blade through fluent container contents and to improve mixing. Blade 85 is suitably fitted to or otherwise held to magnet or magnetic material 83, and on that basis the mixer may be referred to as being magnetic or of magnetic material although most of the blade portion thereof is non-magnetic. Of course, the blade may also be of magnetic material, such as iron or other ferromagnetic element or alloy, previously magnetized or not. As shown, magnetic base 83 has a flat bottom so that it can be supported by the interior bottom 87 of container 55 and can freely rotate or oscillate with respect to such bottom and such container. During rotations or oscillations the mixer may tend to approach the container's interior side walls 89 and in so doing will move any contents or layer of contents clinging to such wall, thereby promoting better mixing. When such "wobble" action is not desired the mixer may have a bottom projection or depression therein matching a corresponding depression or projection (none are illustrated in the drawing) in the container bottom wall 87 so as to maintain the mixer centered and keep it in true axial rotation with respect to the container. Alternatively, the magnetic part may be fitted into a stabilizer ring (not illustrated) to maintain axial rotation. Although the level of the material being heated and mixed is shown at 82 as being slightly above the top of blade 81 it is within the invention to have such level at any of various heights, both above and below such mixer top, but preferably it will be near the top and often within 1 cm. of the top of the blade or mixer part.

Figure 4:
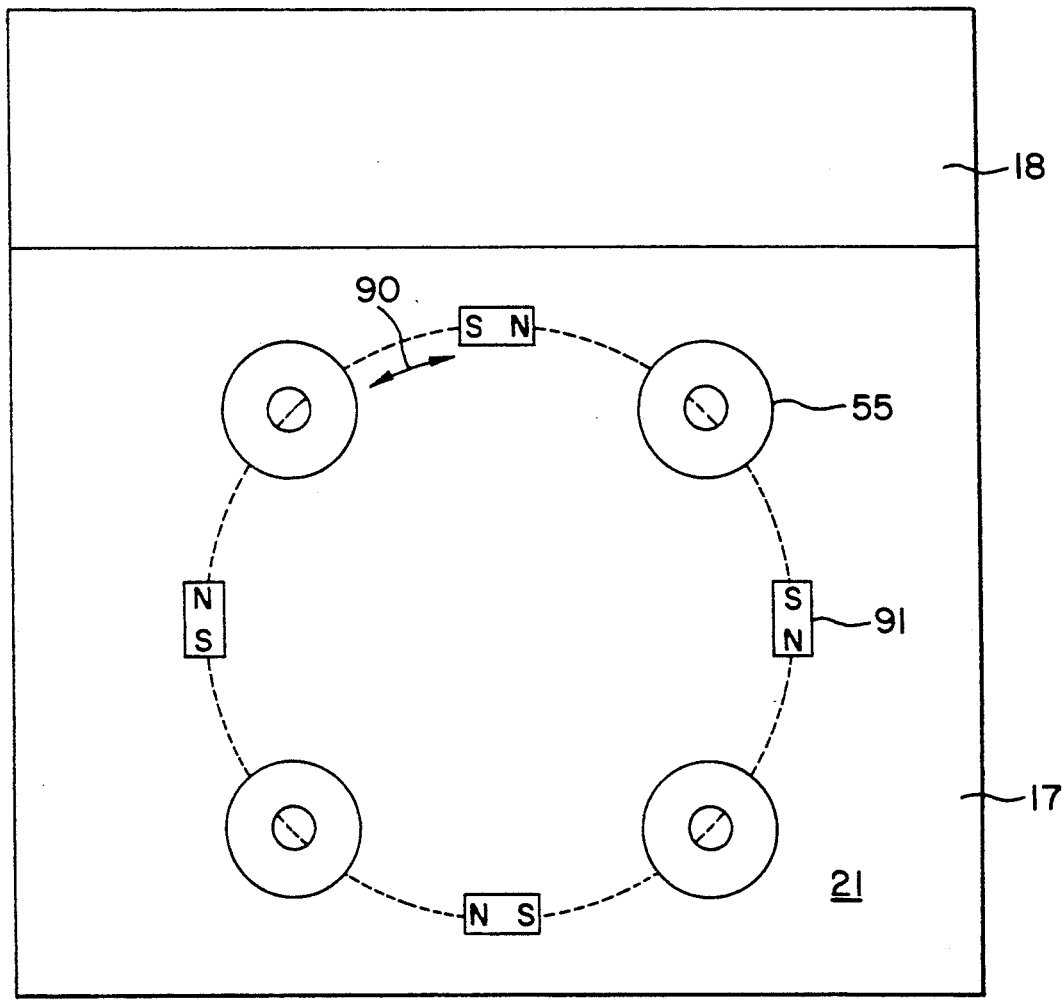
FIG. 4 is a top plan diagram illustrating the paths of a plurality of containers (which contain magnetic stirrers) with respect to a plurality of magnets.

FIG. 4 somewhat schematically represents the relationship between four containers 55 of the present invention which are positioned on a turntable (not specifically illustrated) which is moving in oscillating rotary motion, as per arrow 90, with respect to magnets 91, which are positioned under the bottom 21 of microwave chamber 17. For clarity the magnets 91 are shown in solid lines despite the fact that they are located beneath chamber bottom 21. They may be held to the under side of said bottom member or may be otherwise mounted adjacent to it. Similar magnets may be located under the containers (where illustrated) or doughnut shaped magnets may replace them, and their poles may be at the doughnut interior (hole) and exterior (periphery). Behind chamber 17 is a section 18 of the microwave apparatus that contains the magnetron(s), one of which, designated by 2D, is illustrated schematically transformers and various controls, circuitry microwave mixers, fans and other components of the microwave heating system. Polarities of the bar magnets are shown as alternating, north-south, north-south, north-south and north-south, but other arrangements are also useful and sometimes may be preferred. The magnetic mixers in the containers move in response to changing magnetic fields as the containers (and their mixers) move toward, over and away from the various magnets. It is thus seen that fluent contents of the containers will be mixed while being microwave heated, preferably under pressure, and such mixing is accomplishable while the containers are completely sealed. Also, by having regularly spaced magnets of consistent flux intensities essentially equal mixings may be obtained and therefore heatings of the various similar containers of material should be about the same, so that control of the pressure (and temperature) in one can satisfactorily control such conditions in all the containers.

Figure 5:
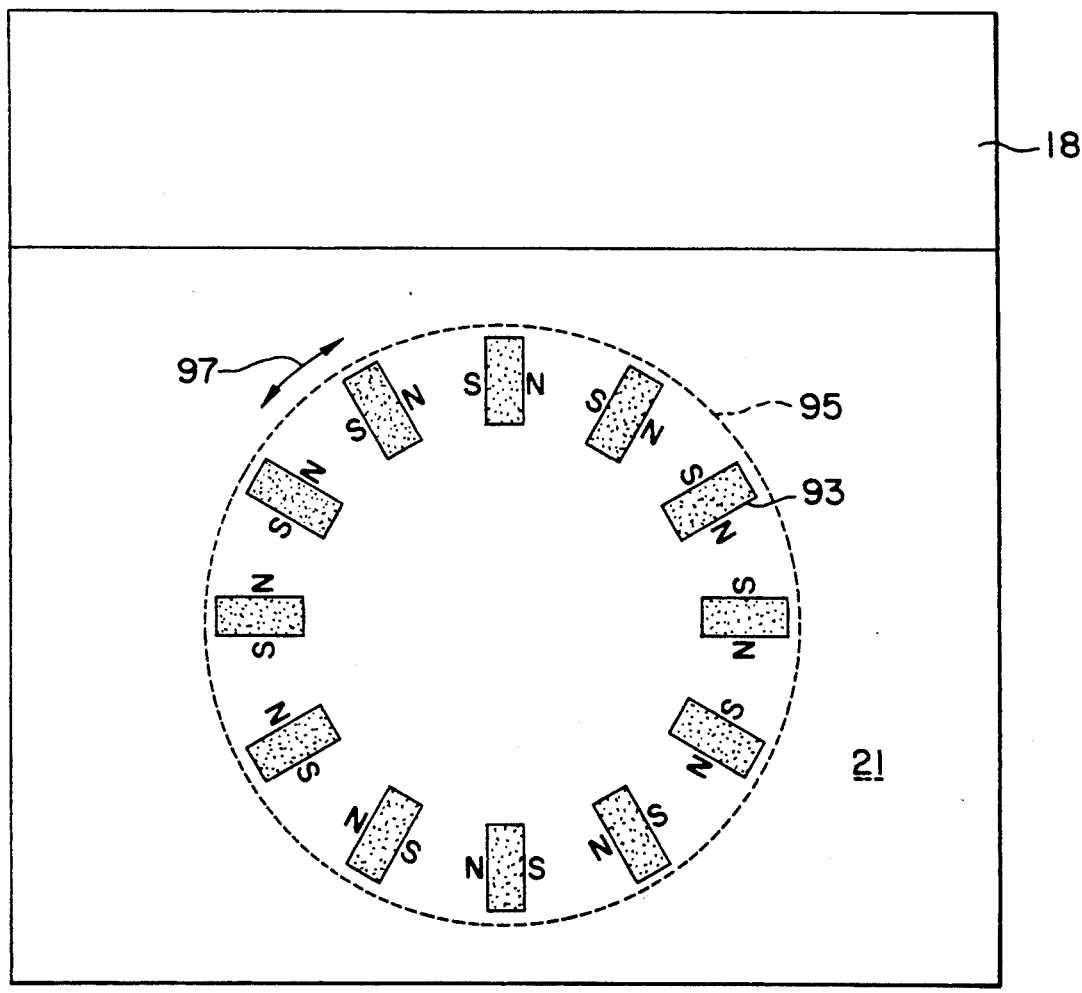
FIG. 5 is a bottom plan view of a portion of the invented system, showing twelve magnets in place below the chamber bottom and illustrating the positioning thereof with respect to the turntable.

In FIG. 5 is shown another arrangement of magnets under the chamber floor and below the turntable, which rotates in oscillating motion. In such figure magnets 93 are in fixed position with respect to chamber floor 21 and turntable 95 oscillates in rotary motion, as indicated by arrow 97. Twelve containers of materials to be heated and mixed are positioned on the turntable, as shown in FIG. 1, with the path of such containers being above the magnets, whose polarities are indicated by N's and S's. In such operation, the turntable makes one complete 360° (each way) oscillation and the mixing blade or mixer makes twenty-four full turns, making one full turn each time it passes over a magnet. However, due to inertia the extents of mixer movements may be greater or less than full turns.

The procedure for setting up the described system is almost self-evident from the drawing and the previous remarks about it. Initially the material to be heated, such as a bacteriological medium, which is to be sterilized so it can be used as a medium for growing bacterial colonies, is measured out into the various containers, very preferably with equal amounts, such as 100 ml., being placed in each 125 ml. container, the containers are installed in the turntable and are sealed, with one of them being connected to the pressure tube to the controller, and desired heating conditions, limiting pressure, turntable oscillating conditions, magnetron operating conditions and lengths and types of heating periods are set digitally, and the system is turned on. The conduct of the heating may be observed through a radiation shielding viewing window and the pressure (and therefore the equilibrium temperature) may be followed on the digital display during the course of the heating, when the system has that capability. If desired several pressure transmitting means may be employed so that pressure readings in a plurality of containers may be followed. Also, it is a feature of this invention that check means may be used to ensure that the temperatures of the materials in the containers actually reach those desired (this can be important where certain temperatures have to be reached in order to ensure that sterilization, as of bacteriological media, has actually taken place). In one embodiment of the invention such checking is effectable by means of a temperature probe which enters the container through a sealable opening for the pressure tubing and in another-case color changing crystalline materials, such as those manufactured by Tempil Division of Big Three Industries, Inc., may be employed. For example, when such a material changes color noticeably at 149° C., which is slightly above the equilibrium temperature of 148° C. at 50 pounds per square inch gauge, which applicants consider to be a desirable pressure for sterilizing bacteriological media (when such are held at that temperature for as little as a few seconds), it indicates that sterilization has been accomplished. The white to black color changing crystalline material may be placed inside the container, above the liquid in it, or on the inner part of the seal, and in some cases it may be attached to the exterior of the container below the level of the contained liquid. Different crystals may be employed to ensure that the ones used will not be adversely affected by the contents of the container, when installed inside, or to compensate for any temperature drop over the thickness of the container wall, when installed externally. Such replacements and compensations can be easily made by one utilizing the invention.

The materials to be heated may be heated to digest or react them, to fuse them, to dry them (in which case means for facilitating exiting of water vapor produced will be provided) or to sterilize them, or for various other purposes. In the case of sterilization, initially it may be desirable to check to make sure such has actually been accomplished but after a number of runs verifying the feasibility of the procedure it is considered that such checking may be discontinued or may be employed on a spot basis only.

Although when sterilization, as of bacteriological media, is being undertaken it is usually of importance to be able to ascertain the temperature and/or pressure of/on material being heated, that will not always be necessary. When other types of operations are being undertaken special measuring and controlling means may not have to be installed for determination and control of such condition(s). In a broad sense the invention relates to magnetic mixing of material in a moving container in which a magnetic mixer is activated by an external magnet near which it is moving. The "magnetic aspect" of the heating and mixing system of the invention relates to microwave heating of contained material by magnetically agitating or mixing such material during microwave heating thereof in a container. Another broad description of the invention is microwave heating of a material in a sealed container (sealed to protect the contents from contamination and/or escape or loss of contents and/or pressure loss), with the material being heated also being agitated or being mixed during the heating operation, as by mixing means located inside the container (and not being physically connected to the outside thereof by any moving part). An apparatus for carrying out some aspects of the broad invention may be described as: a mixing apparatus for mixing fluent material in a mixing vessel which comprises a mixing vessel, a support for the vessel which is movable, means for moving the support, magnetic means near the path of motion of the support and supported vessel, and mixing means in the vessel that is magnetically movable by the magnetic means as the mixing means passes by the magnetic means, so that it moves with respect to the container and the contained material, and mixes such material. In a preferred form of such apparatus the vessel is sealed, with the mixer inside, and with no drive member for the mixer physically connected to it and passing from it to outside the vessel.

While it is preferred to employ permanent magnets as external magnetic means to drive an internal mixer, electromagnets may also be utilized and the activities thereof may be controlled so as to control the mixing being effected. Thus, charges to the electromagnet coils may be increased or decreased, or turned on or off to control the movements of the mixers and thereby promote best mixings of the materials being heated.

In addition to magnetic means being utilized for mixing while microwave heating container contents, other means may be substituted or used in combination therewith, such as mechanical means, vibratory means and ultrasonic means. Thus, it is within such aspects of the invention to utilize a solenoid positioned under the turntable so that its core or an extension thereof will strike the underside of the turntable when the solenoid is energized, thereby moving the container and creating mixing currents in the contained material. Alternatively, the turntable can be spring loaded or otherwise designed to speed up, slow down, be lifted or be dropped down, as by motor control or by suitable mechanical lifters, such as cam and roller combinations, e.g., rollers mounted on the underside of the turntable and moving the turntable upwardly and downwardly in response to contacts with cams, or riding on rising and decending tracks, positioned below the rollers. In another embodiment of such mechanical aspect of the invention the container material to be heated may be held in an oscillating supporting member that permits pendulum-like movement of the container. Thus, when directional changes are made, due to the oscillating motion, the container is "shaken", thereby helping to mix or agitate the contents. It will be noted that the mechanical mixing means most often are means for moving the container of material to be heated in a direction that has a vertical component but means for moving such containers and/or their contents by other operations are also contemplated as being useful, such as those which move the contents inertially.

In another aspect of the invention ultrasound may be employed, with a probe or horn being directed at the material being heated. Use of ultrasound has the further advantage, with respect to sterilization of bacteriological media, that in addition to producing heat to destroy bacteria present in the medium, the ultrasound also has its independent destructive effect. Suitable ultrasound probes and horns are available from Heat Systems-Ultrasonics, Inc. and are described in their 1987 SONICATOR ® Bulletin and their 1988 SONICATOR Application Notes. One such device, designated by 50, is illustrated schematically in FIG. 1. Instead of employing ultrasound other means may be utilized, including vibratory means, either directly in the material to be agitated or in contact with the container for such material.

Various types of equipment and materials useful in construction of the invented system will now be mentioned but it will be understood that such description is not to be interpreted as limiting. A useful and practical source of microwave radiation has already been described but other microwave generators and controllers may also be employed. The microwave frequency will normally be 2.45 gigahertz but it may be any suitable frequency in the range of 0.3 to 50 gigahertz. The power of the microwave apparatus will normally be in the range of 600 to 2,000 watts, with the higher powers being preferred, but apparatuses of still greater powers are also contemplated and may be preferred in the future. Usually the power to the magnetron is controllable in the range of 0 to 100% power and it may also be "stepped", when desired.

The turntable, carousel or other support for the polymeric plastic material which is microwave transmissive and is capable of withstanding the temperatures in the microwave system that are generated during the heating operation. Although poly-lower alkylenes, such as polypropylene, are preferred one may also employ fluorinated polymers, such as polytetrafluoroethylene (Teflon ®) and polyether imides (Ultem ®), and other useful polymerics. Desirably, the turntable should be removable from its drive mechanism and from the microwave apparatus to facilitate quick cooling of the materials that were heated, but that is not necessary. Such quick cooling can be effected if a removable turntable, containing twelve or so containers of sterilized bacteriological medium, is removed from the microwave apparatus and then submerged in ice water or other coolant (or has coolant sprayed on or flowed over it) to effect quick cooling of the containers (except for the pressure monitoring containers, if no pressure retaining stop-cock is present). Such cooling, as to pressures below atmospheric and temperatures of about 95° to 100° C., preferably below 100° C., lowers the pressures in the containers so that they may be opened, and the contents may be quickly transferred to other vessels, dishes and plates, if desired. The turntable drive means, which was not specifically illustrated because it is conventional, may rotate with or without oscillation, although oscillatory motion is much preferred. Such rotational speeds will normally be within the range of 2 to 30 revolutions per minute, e.g., 10 r.p.m., and for oscillating rotational motion,,the frequency of oscillation will normally be in the range of 3 to 20 oscillations/min. (o.p.m.), preferably 5 to 15, e.g., about 10, and the extent of oscillation will be in the range of 10° to infinity (no oscillations), preferably 90° to 720°, more preferably 135° to 450° and still more preferably 180° to 405°, e.g, 360°. When a pressure controller is connected to one or more of the containers more complex connection is required if the turntable moves in ordinary rotational motion, rather than in oscillating rotation. For such reason, and also because oscillating motion helps to create a mixing effect in the contained material being heated, such oscillating motion of the turntable is highly preferred.

The magnets that are positioned under the turntable can be any such suitable magnets. For simplicity and cost effectiveness normally ordinary permanent magnets, such as those of cobalt-nickel alloy or of ferromagnetic material can be used but ceramic magnets are preferred. The number of magnets positioned on the turntable depends on the type of mixing desired and the number of containers of materials to be mixed but this number will normally be within the range of 1 to 20, preferably 2 to 16, more preferably 6 to 14, e.g., 10, 12. Magnets may be of bar and/or doughnut and/or other suitable shape and may be positioned directly under the path of the containers during rotation or oscillation, toward the center or toward the circumference of the turntable, so long as their magnetic effects cause desired movements of the magnetic mixers in the container. Although it is not essential that the poles of the magnets be aligned along the path of the container centers, and sometimes it may be desirable for them to be angled to such path, normally such alignment is preferable. Also, the polarities will usually be alternating but N-N and S-S arrangements are operative, too, as are mixtures of N-N, S-S and N-S, N-S. A useful feature of the invention is that the presence of the magnets adjacent to the microwave chamber results in a mode stirring effect and helps to avoid hot and cold spots in the medium being heated. The magnetic field does not interfere with the microwave heating and the microwaves do not weaken the field.

The number of containers for the materials to be heated on the turntable will normally be in the range of 1 to 50 or 100, preferably 1 to 25, more preferably 2 to 20 and still more preferably 4 or 6 to 16, e.g., 10, 12, and such containers are vertically cylindrical in shape. The walls and parts thereof are at least partially comprised of microwave permeable material and are preferably completely made entirely of such material, as are other items in the microwave chamber, whenever that is feasible. Normally the containers will be made of synthetic organic polymeric plastic and of these the preferred materials of construction are polyimide resin and fluoropolymers, such as polytetrafluoroethylene, for inertness, microwave transmission properties and strength at higher temperature and pressures. Pressure tubing communicated with the vessel and any other such tubing and hoses connected to the vessel, such as those which may enclose or cover apertures, probes, cables, ultrasonic means elements, etc., are preferably of Teflon, which is temperature resistant, chemical resistant and flexible enough to withstand any twistings and untwistings that may be encountered due to rotations of the turntable.

The magnetic mixer or stir plate which, in conjunction with the magnet, constitutes the mixing means, is preferably of a synthetic organic polymeric plastic material, such as polytetrafluoroethylene or polyimide resin, which is inert to the contents of the vessel in which it is present and is sufficiently dimensionally stable at temperatures to which such material is expected to be heated. While various suitable shapes of such mixers may be employed the simplest is a vertical blade or thin strip which is coaxial with the container and which satisfactorily mixes the contents thereof and may clean the interior sides of the container of such contents during use. Such blade is preferably perforated, as illustrated, and is joined to and/or driven by movement of a magnetic mixer part, which is preferably located below the blade. Such part should be of magnetic material, such as a ceramic magnet (preferred, because its magnetism is restored after heating), cobalt-nickel or other ferromagnetic material, which should be enclosed in a synthetic organic polymeric plastic covering so as to prevent contact thereof with contents of the container. The mixer will normally be rectangular in shape and will extend from 50 to 95% of the height of the container, e.g., 80%, so as to promote best mixing. The magnetic means in the container, by which the mixing blades are driven, will normally have the poles thereof positioned so that they are best responsive to magnets under the turntable Normally this means that such poles will be in essentially the same horizontal plane but that is not necessary for satisfactory operation of the mixer.

In the processes of this invention for heating materials, using the described system, containers will normally be of a volume in the range of 5 to 2,000 ml. and preferably 50 to 400 ml., will usually be vertical cylinders of a height/diameter ratio in the range of 1:1 to 20:1, preferably 1.5:1 to 5:1, and will contain a mixing element or blade which extends for at least half the height of the cylinder. The container will be filled from about 50 to 90% of the cylinder height with material to be heated, which may be in liquid, semi-liquid or pulverulent solid state. Such heating may be to sterilize, digest, react, dry or otherwise treat such material, and the temperature to which the material is heated may be in the range of 80° to 200° C., more preferably 100° to 180° C. or 120° to 170° C., and most preferably, 146° or 150° to 160° C. or more, e.g., to 180° C., for such materials which contain water or are hydrated.

Such heatings of aqueous materials to temperatures over 100° C. require that they be pressurized, and experimentation has shown that the pressure should be raised to at least 46 lbs./sq. in. gauge, and preferably to at least 50 p.s.i. g., e.g., 50 to 100 p.s.i. g. or more preferably 50 to 60 p.s.i. g. Such pressures are gauge pressures and correspond to about 3.2, 3.5, 4.2 and 7.0 kg./sq. cm. g., 61, 65, 75 and 115 lbs./sq. in. absolute (p.s.i. g. or 4.3, 4.6, 5.3 and 8.1 kg./sq. cm. absolute. Equilibrium temperatures for such pressures are 146°, 148°, 153° and 170° C. The range given are for sterilization procedures wherein absolute sterilization is the aim and wherein it is usually undesirable to employ higher temperatures than sufficient, due to possible degradation of the medium being sterilized. However, in other processes different temperature ranges may be employed, and such may range from as low as 40° or 50° C., to as high as 400° C., depending somewhat on the capabilities of the equipment being employed, and the material being heated. Materials to be sterilized will normally be heated for as short a time as necessary for sterilizations and it has been found that all that is needed is to bring the temperature (or pressure) to a certain level, after which the material may be cooled and will be found to be sterile. Depending on the magnetron power and the volume of material being heated the total heating operation may take as little as 15 seconds or as much as sixty minutes, usually depending on the total volume of being heated, but normally such times will be 2 to 30 minutes, preferably being 4 to 15 minutes, and more preferably 4 to 8 minutes. Overall operations are speeded by cooling the containers and their contained materials outside the microwave system to lower the internal pressures, which facilitates early openings of the containers, at pressures no greater than 8 p.s.i. g., e.g., 5 and 1 p.s.i. g., and discharging of contents. The presence of a screw cap on the container facilitates slow opening thereof and gradual pressure release, minimizing any "boiling" of the medium, which is cooled by evaporation as some of the medium is vaporized.

The desired heatings are obtained by employing the previously described numbers of containers on the turntable, by utilizing the oscillating rotational movements described for the invented systems and by heating to the indicated pressure (and corresponding temperature). The results are satisfactory heatings of the materials and assured sterilizations. Without pressurizing heatings of the type described, with mixing, significantly longer periods of microwave heating are required to sterilize media and in a few cases the media may not be sterile. Such disadvantages are overcome by the present invention because materials treated in the manner described are sterilized in every case, as was established by rigorous testings of multiplicities of samples, using the invented procedures and systems, and comparing them to controls treated by autoclaving and by microwave heating without the described mixing during the heating period.

The following examples illustrate but do not limit the invention. Unless otherwise indicated all parts in these examples, this specification and the appended claims are by weight and all temperatures are in ° C.

EXAMPLE 1 (Experimental)

To test the evenness, thoroughness and efficiency of microwave heating and sterilization, with stirring, by means of the invented system and process, the system was employed to heat aqueous bacteriological medium (Difco ®) nutrient broth, inoculated with spores of *Bacillus stearothermophilus*, a difficultly sterilizable test organism. The amount of nutrient broth employed was 100 milliliters and it was contained in a polyether imide (Ultem) vessel of 125 ml. capacity, of cylindrical shape of approximately 1.8:1 height:diameter ratio. The 100 ml. of nutrient broth was inoculated with 107 spores of *Bacillus stearothermophilus* so that the concentration of spores was $10^5$ per ml.

The system employed is that illustrated in FIG's. 1 and 4, with eight magnets being present (4 bar and 4 doughnut). Details of the container and mixer are best illustrated in FIG's. 2 and 3. The mixer is a flat blade mixer of polytetrafluoroethylene, which is coaxial with the container and which is driven by a base magnetic portion which is a ceramic magnet encased in polytetrafluoroethylene. Each of the twelve containers is filled with 100 ml. of inoculated broth and one container is connected to the pressure sensor via pressure tubing. All twelve containers are mounted on the turntable, which passes over the eight permanent magnets also being included, under the four containers shown). The digital controller is set to make ten complete 360° oscillations per minute at 2,000 watts power to the magnetron, and within about five minutes the pressure in the monitored container is 50 p.s.i. g. During the heating period the mixers made approximately sixteen revolutions per oscillation or 160 oscillations of each of the mixers per minute. When a transparent vessel material is employed (Ultem is opaque) it can be visually observed that the broths are kept in turbulent motion in the vessels. As soon as the pressure reached 50 p.s.i. g. (4.6 kg/sq. cm. a.) microwave heating was discontinued and the containers were cooled as quickly as possible, which took about five minutes, to cool them to about one p.s.i. g., at which pressure the containers could be vented and opened, and samples of the heated products were taken.

The samples taken were diluted with sterile saline solution, with 10, 100 and 1,000 parts of saline solution being used per part of treated broth, and 0.1 ml. each of such dilutions was incubated on separate nutrient agar plates, in duplicates, and plates with a reasonable number of colonies for counting (in the range of 30 to 300 per plate) were used for colony counts. Based on the assumption that each isolated colony is generated from a single spore/cell and knowing the dilution factor, the number of living spores/ml. in the treated material can be calculated from the colonies counted. After such heating to 50 p.s.i. g. incubation of an agar plate coated with the medium did not show any colonies to have developed although the concentration of spores in the inoculated broth before microwave heating/mixing was $6.7 \times 10^5$ per ml. The experiment was repeated and samples were taken from three additional vessels, all of which initially contained $6.4 \times 10^5$ spores/ml., and in all three cases no colonies grew on the agar plates. The same runs were repeated except for raising the pressure to 55 p.s.i. g. (3.9 kg./sq. cm. g.) and no cell colonies were cultured from the heated and mixed material although the inoculated nutrient broth had contained $7.6 \times 10^5$ spores/ml. More samples of inoculated nutrient broth were microwave heated and mixed in the same manner, and were cultured, and again none of them showed any colonies growing on the agar plates although initially the nutrient broth had contained $6.7 \times 10^5$ spores/ml. In further repetitions of the treatments by the invented process, using the invented systems described and raising the pressures to 60, 65, 70, 75 and 80 p.s.i. g., no cell colonies were grown on the agar plates although the initial concentrations of *Bacillus stearothermophilus* spores in the nutrient broths was $7.6 \times 10^5$ ml. for all such samples. In additional runs employing the same treatments but with the pressures at 47, 48 and 49 p.s.i. g., no cell colonies grew on the agar plates although the initial concentration of spores in the nutrient broths was $6.4 \times 10^5$ spores/ml. When the system was operated to produce a pressure of 45 p.s.i. g., followed by immediate cooling of the container of broth and agar plate testing, 15 cells/ml. were grown on the agar plate, down from $5.7 \times 10^5$ spores/ml., but unsatisfactory because the broth was not sterilized. In similar runs, using a broth which had $4.6 \times 10^5$ spores/ml., the container of broth was treated in the same manner except that it was held at 45 p.s.i. g. for five minutes, with stirring. Samples from three runs showed no colonies on agar plates after incubation.

The above results prove that microwave heating, with stirring, in the manner described, can be used to sterilize inoculated or contaminated nutrient broths and other bacteriological culture media providing that the pressure of such medium is raised to at least 46 p.s.i. g., and preferably at least 50 p.s.i. g., or if it is raised to 45 p.s.i. g. and such pressure is held there for 2-10 minutes, e.g., 5 min. with mixing. Results obtained in this experiment are surprising and are considered to be of great significance because by microwave heating while mixing and increasing the pressure in the container for materials to be sterilized, assuredly perfect sterilizations can be obtained, without the need for maintaining the material being treated for comparatively long times at elevated temperatures and pressures. While it might be argued that mixing would be expected to improve sterilization because it would move hidden or protected spores into higher temperature sections of the microwave heated volumes, the present containers have relatively little volume which might be called hidden or protected. Also, the nutrient broth is a relatively thin material and is high in water content so microwave heating thereof should be very efficient. Therefore, it would not be expected that the microwave heating, with stirring, would be so important in producing good sterilizations.

Similar results are obtainable when other media, whether normal, contaminated or inoculated, are tested, and when other materials are heated in the described microwave system, while mixing in the manner described. Such is also the case for efficient heatings of other materials being digested (such as nitric acid treated heavy metal wastes), chemically reacted or analyzed, using the described system and process. In drying operations or where water vapor removal is to be effected, the described system can be employed (modified to remove water vapor that is generated) without the need for raising the pressures to the figures given, and more efficient heating will still be obtained.

Instead of employing magnetic mixing, mechanical mixing may be used, although it is not nearly as efficient and the apparatus is more difficult to operate and maintain, or ultrasound or vibratory means may be employed, as described in the preceding specification. Also, to double check this system to make sure that the desired pressure has been obtained one may install color changing crystalline materials, such as those manufactured by Tempil Division of Big Three Industries, Inc., some of which turn from white to black at a temperature of 149° C., which is equivalent to about 52 p.s.i. g. (3.7 kg./sq. cm. g.). Such installations may be internally of the container or exterior to it, with a correction factor being applied to compensate for the temperature gradient across the container wall when external installation is adopted.

EXAMPLE 2 (Control - Autoclave)

Nutrient broth, inoculated with spores of the severe test organism, *Bacillus stearothermophilus*, in the manner described in Example 1, was autoclaved under different conditions and such autoclaved broths were plated to determine the extent to which the spores had been killed by the autoclaving. The containers were the same as those employed in Example 1 and the volume of broth heated in each container was 100 ml. A standard autoclaving pressure of 15 p.s.i. g. was employed in all cases to raise the temperature of broth to 121° C. When it was held at such temperature and pressure for fifteen minutes in the autoclave it was found that comparatively low reductions in viable spores had been effected. For example, an initial population of $2.4 \times 10^5$ was reduced to $2.3 \times 10^5$ cells/ml., an initial concenspores/ml. an initial concentration of $2.0 \times 10^5$ was reduced to $6.8 \times 10^4$ and initial concentrations of $1.9 \times 10^5$, $1.9 \times 10^4$ and $1.9 \times 10^3$ were reduced to $1.2 \times 10^5$, $1.0 \times 10^4$ and $3.6 \times 10^2$, respectively. When the autoclaving was over a twenty minute period reductions were from $8.7 \times 10^5$, $8.7 \times 10^4$, and $8.7 \times 10^3$ to $1.3 \times 10^5$, $1.3 \times 10^4$ and $9.4 \times 10^2$, respectively. Autoclavings of thirty minutes resulted in reductions from $1.9 \times 10^5$, $1.9 \times 10^4$ and $1.9 \times 10^3$ to $4.4 \times 10^2$, $1.2 \times 10^2$ and less than 10 (and more than 1) cells/ml., respectively but no broth was sterilized under such conditions.

From these data it is clear that autoclaving, even for as long as thirty minutes, at a normal autoclaving pressure of 15 p.s.i. g., is not as effective as the quicker processes of the present invention, utilizing the described invented systems. Also, with respect to autoclaving operations, it must be kept in mind that before the autoclave can be opened it must be cooled, which takes about thirty minutes, because of the large quantity of water in the autoclave, etc., so even if autoclaving was effective for sterilizing, the additional time required would militate against using it, in comparison to the present system.

EXAMPLE 3 (Control - Microwave Heating Without Mixing)

The procedure described in Example 1 was followed exactly except for omission of mixing, by omitting the mixers from the containers of medium being heated by the microwave apparatus, and by extending the microwave heating times. Thus, instead of "flash sterilization" being employed, wherein the magnetron was shut off immediately upon reaching the desired pressure, that pressure was maintained for different periods of time, up to fifteen minutes. 22 Runs were made at pressures ranging from 30 p.s.i. g. to 80 p.s.i. g. and with microwave heatings over time periods of 5 to 15 minutes. The runs of 45, 70 and 80 p.s.i. g. included only five minute heating times each but those at 30, 40, 50 and 60 p.s.i. g. all included 5, 10 and 15 minute heating periods. In only one of these cases, 60 p.s.i. g. for fifteen minutes, was sterilization obtained.

The experiments of this example prove that employment of the present heating (and sterilization) system requires mixing of the medium being heated during the microwave heating thereof to be most effective. When the described mixer is present and is activated in the manner mentioned sterilization (which may be considered to be a measure of effective heating) is obtainable with "flash treatments" at relatively low pressures and temperatures, whereas without such effective. Also, because of the structure of the present system such heating can be effected without danger of contaminating the material being heated because it is heated in a closed container which does not communicate with the atmosphere or with any external parts by means of passageways which could allow entry of contamination into the container for the material being heated.

From the foregoing disclosure, including the illustrative examples, it is evident that the present invention is for a greatly improved microwave heating system which is especially effective in sterilizing fluent materials, such as nutrient broths, which are to be used as bacteriological media, and must be sterile for such use. Such heatings are effectable in sealed vessels and the contents thereof are mixable by a simple enclosed mixing element, which is activated by relative motion between containers, on a moving turntable or other support, and a magnetic drive positioned so as to move mixing elements in the container during movements of such support.

All references mentioned herein are hereby incorporated in this specification by reference.

The invention has been described with respect to illustrations and examples thereof but it is not to be limited to these because it is evident that one of skill in the art, with the present specification before him/her, will be able to utilize substitutes and equivalents without departing from the invention.

What is claimed is:

1. A system for improved microwave heating of a material in a container in a microwave chamber, which comprises a walled chamber, a source of microwave radiation, which radiation is directed into the chamber, a walled container in the chamber for holding material to be heated, supporting means in the chamber for supporting the container and for moving it in substantially horizontal rotary or oscillating rotary motion, and means for mixing the material to be heated in the container during microwave heating thereof, which means comprises stationary magnetic means under the walled container and under the supporting means, and a magnetic mixer in the container, which magnetic mixer is set in motion by relative changes in a magnetic field generated by the stationary magnetic means as the container and the magnetic mixer in it are moved past the stationary magnetic means, thereby mixing contained material.

2. A system according to claim 1 wherein the chamber wall(s) confine(s) the microwave radiation therein, the container has a wall portion thereof with a sealable opening therein, sealed by a sealing closure, so that the container may be pressurized and the temperature of contents may be raised thereby, and so that no contaminating material may enter the container curing heating of contents therein, and such container wall portion is at least partially comprised of microwave permeable material so that the microwave radiation from the source of such radiation can be transmitted to material in the container through such wall portion, 3. A system according to claim 2 wherein the supporting means is a turntable which rotates unidirectionally or oscillates over at least 10° in a horizontal plane, and a plurality of containers, with a plurality of mixers therein, is supportable on such turntable.

4. A system according to claim 3 wherein a plurality of magnets is in stationary positions under the turntable so that the magnetic mixers will move a plurality of times per single rotation of the turntable.

5. A system according to claim 4 wherein a plurality of containers, each with a magnetic mixer therein, is positioned on the turntable.

6. A system according to claim 5 wherein the turntable oscillates in rotary motion.

7. A system according to claim 6 wherein the rotation of the turntable is between 90° and 720°, the number of magnets is in the range of 1 to 20 and the number of containers is in the range of 1 to 50, and at least one of the containers communicates with or incorporates means for monitoring, signalling or controlling pressure or temperature of the contents of the container.

8. A system according to claim 7 wherein a signalling means is present which indicates when an elevated temperature has been reached in the container, which means is a color changing substance in the container.

9. A system according to claim 6 wherein the oscillating rotation of the turntable is between 135° and 450°, the number of containers on the turntable is in the range of 12 to 25 and the number of magnets under the turntable is in the range of 2 to 16.

10. A system according to claim 9 wherein the oscilating rotation of the turntable is in the range of 180° to 405°, the number of containers on the turntable is in the range of 4 to 16 and the number of magnets under the turntable is in the range of 6 to 14.

11. A system according to claim 10 wherein the containers are vertically cylindrical, the mixers extend vertically within the containers and are coaxial therewith, have blade shaped mixing members with peripheral portions thereof passing adjacent to the inner walls of the containers, with openings in such blades to facilitate movements of the blades through the material to be mixed, and have base portions which rest on the interior bottoms of the containers and which act as bearings for the mixers, when the mixers are in motion.

12. A system according to claim 11 wherein the containers are of polyether imide resin and the mixers are of polytetrafluoroethylene, with a magnetic portion thereof in the base covered with polytetrafluoroethylene.

13. A system according to claim 2 wherein the container is vertically cylindrical and the mixer extends vertically within the container, is coaxial therewith and has peripheral portions passing adjacent to the container inner wall when the mixer is in motion.

14. A system according to claim 13 wherein the mixer is blade shaped with openings in such blade to facilitate movement thereof through material to be mixed, and has a base portion which rests on the interior bottom of the container and acts as a bearing for the mixer.

15. A process for simultaneously heating and mixing a fluent material which comprises heating such a material with microwave radiation while mixing it in a microwave transmissive container by means of a mixer in such container which moves in response to changes in a magnetic field, which field is generated by a stationary magnet located below the container, and which changes in such field are caused by moving the container relatively with respect to the magnet.

16. A process according to claim 15 which comprises heating such a material to an elevated temperature, in the range of 80° to 200° C. by means of microwave radiation of such fluent material while it is contained in a moving vessel of microwave permeable material, which vessel is moving in rotational or oscillating rotational motion with the oscillations being at least 10° and being in the range of 3 to 20 oscillations per minute, while such material is being mixed inside the vessel by an internal mixer which is activated by a stationary magnet positioned underneath the vessel and contained mixer, and over which they move.

17. A process according to claim 16 wherein the heating is to a temperature in the range of 120° to 170° C., the vessel oscillates in the range of 90° to 720° at 5 to 15 o.p.m. and the container is raised to a pressure in the range of 15 to 100 p.s.i.g.

18. A process according to claim 17 for heating and sterilizing a fluid material which comprises heating a plurality of sealed vessels of such a material to an elevated temperature and pressure, in the ranges of 46 to 60 p.s.i. g. and 146 to 153° C. by means of microwave radiation of such material while it is contained in such moving vessels, which are of polyimide resin, which vessels are moving in oscillating rotational motion with the oscillations being in the ranges of 180° to 405° and 5 to 15 per minute while such material is being mixed inside the vessels by internal magnetic mixers which are activated by a plurality of magnets positioned underneath the vessel and the mixers, and over which they pass.

19. A process according to claim 18 wherein the material is a bacteriological medium which is sterilized by the process, and the source of microwave radiation is automatically turned off when designed pressure and temperature, in the ranges given, are reached.

* * * * *